(12) United States Patent
Viger et al.

(10) Patent No.: US 9,445,436 B2
(45) Date of Patent: Sep. 13, 2016

(54) METHOD, DEVICE, COMPUTER PROGRAM AND INFORMATION STORAGE MEANS FOR OPTIMISING ACCESS TO A WIRELESS MEDIUM IN A COMMUNICATION NETWORK

(71) Applicant: CANON KABUSHIKI KAISHA, Tokyo (JP)

(72) Inventors: Pascal Viger, Janze (FR); Patrice Nezou, Saint-Sulpice la Foret (FR); Romain Guignard, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 172 days.

(21) Appl. No.: 13/904,860

(22) Filed: May 29, 2013

(65) Prior Publication Data

US 2014/0003367 A1    Jan. 2, 2014

(51) Int. Cl.
*H04W 74/08* (2009.01)
*H04W 56/00* (2009.01)

(52) U.S. Cl.
CPC ....... *H04W 74/0816* (2013.01); *H04W 56/002* (2013.01); *H04W 56/003* (2013.01); *H04W 56/0045* (2013.01)

(58) Field of Classification Search
CPC .............. H04W 74/0816; H04W 74/0808; H04W 74/085; H04W 56/002; H04W 56/0045; H04W 56/003; H04W 72/0446; H04J 3/0652; H04L 12/413
USPC ............ 370/350, 337, 445, 319, 324, 509; 455/502
See application file for complete search history.

(56) References Cited

U.S. PATENT DOCUMENTS

| | | | |
|---|---|---|---|
| 2006/0128349 A1* | 6/2006 | Yoon | 455/343.2 |
| 2006/0133408 A1* | 6/2006 | Nogueira-Nine et al. | 370/447 |
| 2010/0202354 A1* | 8/2010 | Ho | 370/328 |
| 2012/0243431 A1* | 9/2012 | Chen et al. | 370/252 |

FOREIGN PATENT DOCUMENTS

| | | |
|---|---|---|
| EP | 2413649 A1 | 2/2012 |
| WO | 2009036786 A1 | 3/2009 |

* cited by examiner

*Primary Examiner* — Alpus H Hsu
*Assistant Examiner* — Elton Williams
(74) *Attorney, Agent, or Firm* — Canon USA, Inc. I.P. Division

(57) ABSTRACT

The invention comprises adjustment of back-off timers to provide consistency of timing in a group of collaborating nodes.

The invention facilitates optimizing access to a wireless medium in a communication network accessible by a plurality of nodes, each node implementing a back-off counting based on carrier sense multiple access with collision avoidance, the plurality of nodes comprising a collaborative group of nodes further implementing a back-off allocation scheme based on each node maintaining a list of expected back-off values of the other nodes of the collaborative group, the group further comprising a receiving node and an emitting node, reception of information from the emitting node being utilized by the receiving node to maintain consistency of timing through adjustment of back-off values.

22 Claims, 7 Drawing Sheets

METHOD, DEVICE, COMPUTER PROGRAM AND INFORMATION STORAGE MEANS FOR OPTIMISING ACCESS TO A WIRELESS MEDIUM IN A COMMUNICATION NETWORK

This application claims the benefit under 35 U.S.C. §119(a)-(d) of United Kingdom Patent Application No. 1209678.0, filed on May 31, 2012 and entitled "Method, device, computer program and information storage means for optimizing access to a wireless medium in a communication network". The above cited patent application is incorporated herein by reference in its entirety.

FIELD OF THE INVENTION

The invention lies in the technical field of wireless communication networks.

The invention pertains to optimizing access to a wireless medium in a communication network using Carrier Sense Multiple Access with Collision Avoidance (CSMA/CA), the network being accessible by a plurality of nodes.

BACKGROUND OF THE INVENTION

Wireless local area networks (WLANs), such as a wireless medium in a communication network using Carrier Sense Multiple Access with Collision Avoidance (CSMA/CA), are founded on the principles of collision avoidance. Such networks may also conform to a communication standard such as a communication protocol of 802.11 type e.g. Medium Access Control (MAC). The collision avoidance approach aims to separate concurrent transmissions in space and time. Packets of e.g. data are corrupted due to collision or channel fading. The transmitter remains unaware of the corruption and continues to transmit the entire packet unnecessarily. Eventually, based on the absence of an acknowledgment from the receiver, the transmitter infers packet loss, and prepares for retransmission.

The IEEE 802.11 standard defines the way WLANs must work at the physical and medium access control (MAC) level. Typically, the 802.11 MAC (Medium Access Control) relies on a contention-based mechanism based on a technique called "Carrier Sense Multiple Access with Collision Avoidance" (CSMA/CA). The standard 802.11 medium access protocol is essentially to wait for the medium to become idle.

Carrier sensing is performed by both physical and virtual mechanisms. The virtual carrier sensing is achieved by transmitting control packets to reserve the medium prior to transmission of data packets. The transmitter attempts to sense an idle medium for at least a DIFS (distributed interframe spacing) duration of time. If the medium is sensed busy, the transmitter waits until it becomes idle and then starts a countdown back-off timer set to expire after a number of slot times, chosen randomly between [0,CW] (i.e. the contention window, CW being an integer value).

More precisely, the period of back-off timer countdown is called the 'back-off procedure', and is implemented as follows:

Upon starting the back-off process, prior to data transmission, a station initializes its back-off time counter to a 'random value'. The back-off time counter is decremented once every time interval for so long as the channel is sensed to be idle (e.g. with reference to FIG. 3, count down starting from T0), halted (or frozen) when a transmission is detected on the channel (e.g. with reference to FIG. 3, count down stopping at T1), and reactivated when the channel is sensed idle again (e.g. with reference to FIG. 3, T2). When its back-off time counter reaches zero, a station transmits a DATA message (or ready-to-send (RTS) message as explained hereafter) which contains the address of the receiver and the duration for which the medium is to be reserved for that message. A collision occurs when two or more stations start transmission simultaneously (e.g. when their own back-off counter has reached zero around the same time). Ideally, the same number of slots is present among all nodes forming the 802.11 cell during the back-off countdown procedure. This may not be always the case in reality, because of inaccuracies in 802.11 quartz which results in clock drifts. The quartz is comprised in the node to be used as a timer device facilitating the countdown process. Different quartz crystals have slightly varying characteristics. A communication standard can specify the accuracy of the quartz which is required for compliance but differences remain. Such differences lead to clock drift.

Since the CSMA/CA protocol does not rely on the capability of the stations to detect a collision by hearing their own transmission, a positive acknowledgement (ACK) is transmitted by the destination station to signal the successful packet reception. The ACK is immediately transmitted at the end of the packet, after a period of time called Short InterFrame Space (SIFS). If the transmitting station does not receive the ACK within a specified ACK Timeout, or it detects the transmission of a different packet on the channel, it reschedules the packet transmission according to the given back-off rules.

Collision Avoidance is more specifically enhanced by a four-way handshaking mechanism called RTS/CTS (request-to-send/clear-to-send) exchange, which is a recommended option of the 802.11 standard.

According to 802.11 standard, to protect transmissions from collisions, a station may begin a transmission sequence with an RTS/CTS exchange. A node will issue a Medium access request (RTS) to a destination node, when the sender node requires data transmission on the 802.11 medium. The duration specified in the RTS is the duration of the entire exchange including the control packets (i.e. including RTS/CTS message exchange). When the intended receiver receives the RTS, and senses the medium to be free, this destination node replies with a Clear-to-send (CTS) message, after waiting for one SIFS (Short InterFrame spacing) period, thereby acknowledging the request and indicating readiness to receive data. The CTS also contains the duration of the entire exchange from that point of time. The transmitter, upon receiving the CTS, transmits the DATA packet after an SIFS period. The receiver responds back with an ACK after an SIFS period following its complete receipt of the DATA packet.

Each wireless node maintains a data structure called the network allocation vector (NAV) to store the aggregate duration of time it knows that the medium would be busy. Any node that hears a packet that is not for itself, sets its NAV for the time duration mentioned in the packet header, which is equal to the time required to transmit all control and data packets. This prevents these nodes from transmitting any packets during the period the NAV is set. It is possible that the receiver does not receive the RTS correctly because of a collision or fading. Even if it does, it may not always respond with a CTS because, for example, the NAV is set. In any case, the transmitter goes through the random back-off and retries. The RTS/CTS mechanism is very effective in terms of system performance, especially when large packets are considered, as it reduces the length of the frames involved in the contention process. In fact, in the assumption of perfect channel sensing by every station, collision may occur only when two (or more) packets are transmitted within the same slot time. If both transmitting stations employ the RTS/CTS mechanism, collision occurs only on the RTS frames, and it is detected quickly by the transmitting stations due to the lack of CTS responses.

In reality, 802.11 nodes suffer from quartz drifting, resulting in clock and timers jittering (typically a value of 100 ppm accuracy is recommended for 802.11 devices). Compared to back-off slot granularity (9 μs in 802.11n), drifting time is not negligible: there is no certainty of access to a given targeted back-off slot.

US patent application 2009/0052429 A1 discloses a method for synchronizing communications in a wireless mesh network. Each of a plurality of network devices are synchronized to an absolute timing based on an absolute slot number.

US patent application 2009/0141738 A1 discloses a time slot system where a back-off counter value determination engine selects an unreserved time slot for a next transmission and a medium access engine for initiating a current transmission. This patent uses a reservation-based distributed collision avoidance channel access in a wireless area network. By advertising the future channel access parameters in advance, nodes reduce the number of collisions. Any extra functionality devised to maintain the reservation procedure adds overhead to the functioning of the device and consumes more bandwidth, both situations being very undesirable.

The IEEE 802.11 Standard provides some clock synchronization services. First, it provides a Time Synchronization Function (TSF), through which all stations synchronize their local MAC-layer protocol timers to the "timestamps" (actually 64-bit microsecond counter values) broadcast in periodic beacon frames sent randomly by 802.11 stations in a distributed ad-hoc environment (there is no access point in such a configuration). Separate from the TSF, the IEEE 802.11 standard also includes an optional capability called MLME-HL-SYNC in the MAC-layer management entity (MLME), which is intended to support application-layer time synchronization protocols.

Unfortunately, neither the TSF timer nor the MLME-HL-SYNC capability can match high specification precision timing requirements of a medium access where drift should be less than half a back-off slot. In particular, the specified tolerances for the TSF timer are relatively relaxed (±0.01%). In practice, its accuracy is likely to be substantially worse because the update mechanism does not account for variability in MAC-layer channel access delays. Moreover, the role of the MLME is strictly limited to issuing the MLME-HL-SYNC.indication primitive at certain end-of-packet events; the MAC client assumes full responsibility for generating the timestamp to this event by consulting an external clock.

Thus the problem of clock drift is limiting to the optimal functioning of wireless medium access.

SUMMARY OF THE INVENTION

It would be desirable, in particular, to reduce the number of collisions on a wireless medium in a communication network while also minimizing the overhead introduced to effect such a reduction.

In a first aspect, the invention sets out to address this problem by means of a method for optimizing access to a wireless medium in a communication network accessible by a plurality of nodes, each node implementing a back-off counting based on carrier sense multiple access with collision avoidance, the plurality of nodes comprising a collaborative group of nodes further implementing a back-off allocation scheme based on each node maintaining a list of expected back-off values of the other nodes of the collaborative group, the group further comprising a receiving node and an emitting node, the method comprising the following steps implemented by the receiving node:

detecting a communication event from the emitting node;
  time stamping of the communication event;
  identifying the emitting node as an origin of the communication event;
  determining an expiration time corresponding to an expected back-off value or back-off count of the identified emitting node;
  determining a slot drift parameter from the said time stamp of the communication event and from the determined expiration time;
  and, applying a slot drift correction, based on the slot drift parameter.

A medium allocation may be used for several nodes at a time, pertaining to a group of peer (collaborating) nodes among legacy wireless stations. A peer node may request access to the shared 802.11 type medium according to the 802.11 legacy protocol, and upon grant of access, the node may communicate with one or more remote peer nodes according to a new collaborative protocol during the reserved talk time. Thus, if the back-off count reduces to zero for one peer node among the group, said node reserves medium access (through classical RTS/CTS scheme) for the group and lets the group share this granted 802.11 timeslot.

Targeting an improved communication service on top of classical 802.11 type CSMA/CA, attention in some areas of the prior art has focused on the grouping of a set of peer nodes among a 802.11 legacy environment, directed to focus on collaborative medium access. TDMA here refers to a time division multiple access communication method used in conjunction with the 802.11 type MAC standard. A legacy environment here describes a situation where nodes are independent and do not interact or cooperate with each other, as opposed to a collaborative group of nodes.

Medium access collaboration is performed by monitoring the 'random values' used to initialize the back-off time counters among the group, in order that no back-off time count duplication occurs. Each node generates a virtual local image of its peers' back-off time counters values by computing the back-off time of each of its peers. Each node manages its own back-off time. Thus, each node of the group can predict the back-off time values of its peers and would attempt for accessing the wireless medium in a distinct back-off slot, avoiding any access collision among the group of peer nodes. If one node would consider numbering any back-off slots occurring in a CSMA/CA cell, the allocation of back-off counts among the group of peer nodes is arranged such that the back-off time expiration of each node is in a different slot number. For example, by considering an absolute scale of back-off slots, the current back-off count being number 'n', the scheme would select 'n+3' and 'n+10' for two distinct peer nodes. The sharing of back-off slot positioning information may be performed either by messaging on the wireless channel, or either by pseudo-random generation of a next back-off slot computation. The count of expired back-off slots (said going from n to n+1) is performed by wireless channel spying.

In a collaborative access context, it is advantageous to avoid extra randomization effects once back-off counters are setup among the group.

Referring again to patent application US2009/014738, where this patent uses a reservation-based distributed collision avoidance channel access in a wireless area network, advertising the future channel access parameters in advance so that nodes reduce the number of collisions.

Some of the multiple advantages of the different embodiments of the invention are described below:
- avoidance of back-off access jittering among a community or group of collaborating nodes;
- ease of implementation within a standard environment;
- no message overhead (reliance only on reception of a communication event such as a request-to-send message);
  - the greater the number of collaborating nodes (comprising the invention) in the wireless environment, the better the medium access accuracy (due to the regular network access which results in regular back-off timer alignment events). It is to be noted that even if 100% of nodes implement the basic collaborative medium access, clock jittering would still occur and would finally result in back-off access jittering and can be corrected by means of embodiments of the invention;
- process remains distributed (no central point required);
- no accurate clock synchronization protocol is required (usually the most accurate protocols are heavy messaging protocols, with lot of interaction messages, e.g. two-way message exchanges between a pair of nodes).

In a further embodiment of the invention, the slot drift parameter is a multiple of a back-off slot time unit.

In a further embodiment of the invention, the step of determining a slot drift parameter comprises further determining:
- a time interval elapsed from an expiration time, ET1, of the expected back-off count of the emitter node;
- or, a time interval before an expected expiration time, SET1, of the back-off count of the emitter node.

In a further embodiment of the invention, the elapsed time interval is determined according to the following steps:
- noticing the expiration of the expected back-off count;
- storing an associated expiration time, ET1;
- and, retrieving the stored expiration time ET1.

In a further embodiment of the invention, the time interval before an expected expiration time is determined by the following step of computing the remaining time before the expected expiration time.

In a further embodiment of the invention, the slot drift correction comprises:
- correcting a back-off counter of the receiving node, and correcting all the expected back-off values of the list maintained by the receiving node.

In a further embodiment of the invention, the slot drift correction comprises a step of adding the slot drift parameter to at least one back-off value.

In a further embodiment of the invention, the slot drift correction comprises a step of adding the slot drift parameter to all back-off values.

In another aspect of the invention there is provided a method for optimizing access to a wireless medium in a communication network accessible by a plurality of nodes, each implementing a back-off counting based on carrier sense multiple access with collision avoidance, the plurality of nodes comprising a collaborative group of nodes further implementing a back-off allocation scheme based on maintaining in each node a list of expected back-off values of the other nodes of the collaborative group, the group further comprising a receiving node and an emitting node, the method comprising the following steps implemented by the receiving node:
- detecting a communication event from the emitting node;
- timestamping the message, to a time T1;
- identifying a peer node of the collaborative group as origin of the request-to-send message;
- checking if an expiration time, associated with the peer node, is stored:
  - if yes, retrieving the stored expiration time;
  - if no, computing the remaining time before expiration of a timer of the peer node of the collaborative group;
- computing an associated time drift;
- computing a slot drift correction based on the time drift;
- and, applying the slot drift correction to all expected back-off values of the list.

In a further embodiment of the invention, the time drift is equal to the time T1 subtracted from the stored expiration time or the remaining time before expiration.

In a further embodiment of the invention, the slot drift correction is equal to the time drift divided by a back-off slot time unit.

In a further embodiment of the invention, the communication event is a request-to-send announcement of the emitting node.

In a further embodiment of the invention, there are provided the further steps, effected by the receiving node, of:
- detecting of a collision event of a communication or collision event of a request-to-send;
- time stamping the collision;
- checking if the collision event originates from a first node of the collaborative group;
- retrieving a next back-off value for the first node;
- calculating if the next back-off value is less than a min value;
- and, if so, picking a new back-off value of the first node in a range [min, CW] where min >1 and CW is an integer maximum value of a contention window.

It is advantageous to distinguish between time difference due to real clock drift and time differences due to collisions on the wireless medium. The probability of confusion is increased if, following a collision, the subsequent back-off value is low in magnitude. By setting a minimum value for the contention window (from which a back-off value will be chosen), which is greater than the average slot drift known for the device, it is possible to distinguish the different types of events.

In a further embodiment of the invention, the step of checking of the collision event origin comprises:
- determining if the timestamp of the collision corresponds to an expiration time of an expected back-off count in the list
- and, identifying the node of the group associated to said determined back-off count, as a first node.

In a further embodiment of the invention, there is provided the further step of updating a back-off value of the receiving node to the new back-off value in the list of back-off values maintained by the receiving node.

In a further embodiment of the invention, any node of the collaborative group is the receiving node and/or the collaborative group comprises a plurality of receiving nodes.

In a further embodiment of the invention, the expected back-off values contained in the list are local images of the back-off counters values of the other nodes of the group.

In a further embodiment of the invention, the local images are internally generated by each collaborative node.

In a further embodiment of the invention, the back-off timers of all nodes are suspended upon detection of the communication event from the emitting node.

In another aspect of the invention there is provided a computer program comprising instructions for carrying out each step of the method according to any embodiment of the first aspect of the invention when the program is loaded and executed by a programmable apparatus.

In another aspect of the invention there is provided an information storage means readable by a computer or a microprocessor storing instructions of a computer program, wherein it makes it possible to implement the method for optimizing access to a wireless medium according to any embodiment of the first aspect of the invention.

In another aspect of the invention there is provided a device for optimizing access to a wireless medium in a communication network accessible by a plurality of nodes, each node implementing a back-off counting based on carrier sense multiple access with collision avoidance, the plurality of nodes comprising a collaborative group of nodes further implementing a back-off allocation scheme based on each node maintaining a list of expected back-off values of the other nodes of the collaborative group, the group further comprising a receiving node and an emitting node, the device comprising:

means for detecting, a communication event from the emitting node;
means for time stamping of the communication event;
means for identifying the emitting node as an origin of the communication event;
means for determining an expiration time corresponding to an expected back-off value of the identified emitting node;
means for determining a slot drift parameter from the said time stamp of the communication event and from the determined expiration time;
and, means for applying a slot drift correction, based on the slot drift parameter In a further embodiment of the invention the device further comprises:

means for determining a time interval elapsed from an expiration time, ET1, of the expected back-off count of the emitter node;
or, means for determining a time interval before an expected expiration time, SET1, of the back-off count of the emitter node.

In a further embodiment of the invention the device further comprises:

means for noticing the expiration of the expected back-off count;
means for storing an associated expiration time, ET1;
and, means for retrieving the stored expiration time ET1.

In a further embodiment of the invention the device further comprises means for computing the remaining time before the expected expiration time.

In a further embodiment of the invention the device further comprises:

means for detecting of a collision event of a communication or collision event of a request-to-send;
means for timestamping the collision;
means for checking if the RTS originates from a first node of the collaborative group;
means for retrieving a next back-off value for the first node;
means for calculating if the next back-off value is less than a min value;
and, means for picking a new back-off value of the first node in a range [min, CW] where min >1 and CW is an integer maximum value of a contention window.

It is advantageous to distinguish between time difference due to real clock drift and time differences due to collisions on the wireless medium. The probability of confusion is increased if, following a collision, the subsequent back-off value is low in magnitude. By setting a minimum value for the contention window (from which a back-off value will be chosen), which is greater than the average slot drift known for the device, it is possible to distinguish the different types of events.

In a further embodiment of the invention the device further comprises means for updating a back-off value of the receiving node to the new back-off value in a list of back-off values maintained by the receiver node.

In another aspect of the invention there is provided a method for optimizing access to a wireless medium in a communication network substantially as hereinbefore described with reference to, and shown in, FIG. 4, 6, 7 or 8 of the accompanying drawings.

In another aspect of the invention there is provided a device for a node for optimizing access to a wireless medium in a communication network substantially as hereinbefore described with reference to, and shown in, FIG. 2 of the accompanying drawings.

BRIEF DESCRIPTION OF THE DRAWINGS

The invention will now be further explained by reference to the drawings.

DETAILED DESCRIPTION OF THE INVENTION

Figure 1:
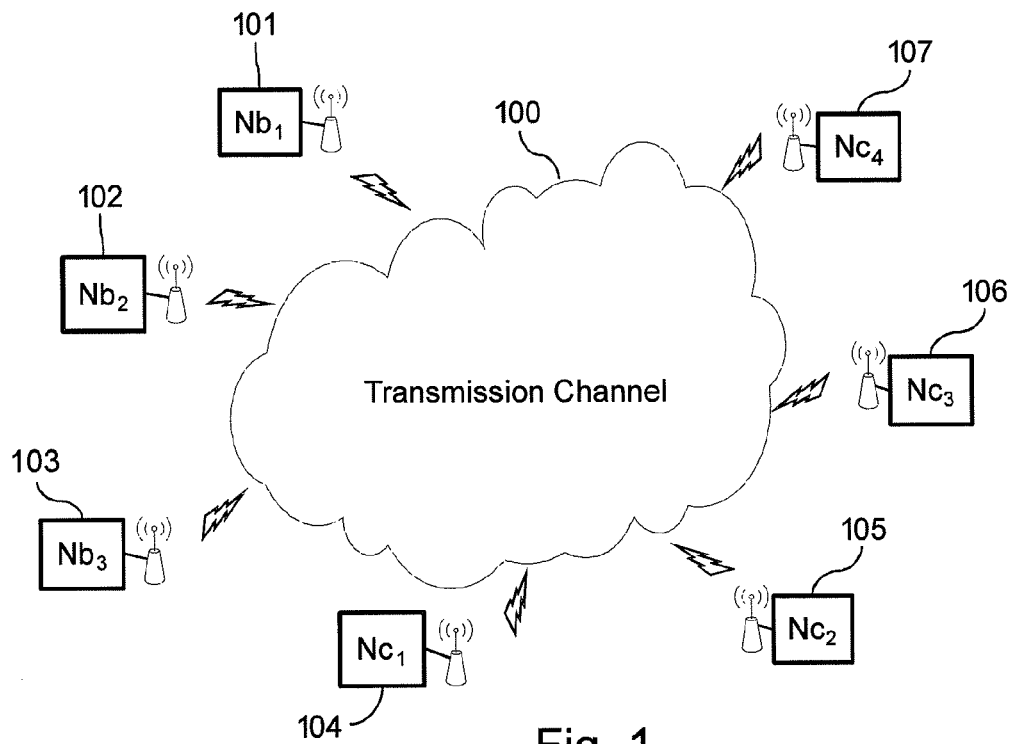
FIG. 1: illustrates a communication system capable of implementing embodiments of the current invention.

FIG. 1 shows an example of a communication system where the present invention can be implemented. In a network using a CSMA/CA channel access mechanism (for example a wireless network implementing the 802.11 standard or an equivalent standard of that type), several nodes 101, 102, 103, 104, 105, 106, 107 exchange data packets through a transmission channel 100 that may drop or corrupt the data packets.

Nodes can be divided into two groups: a first group of Nbi nodes 101 to 103 (where i is an integer between 1 and 3) implementing the 802.11 standard but not the invention (also called legacy stations) and a second group of Ncj nodes 104 to 107 (where j is an integer between 1 and 4) implementing the 802.11 standard and the invention. Data exchange among Nbi nodes and Ncj nodes is managed through standardized 802.11n MAC/PHY layers.

Figure 2:
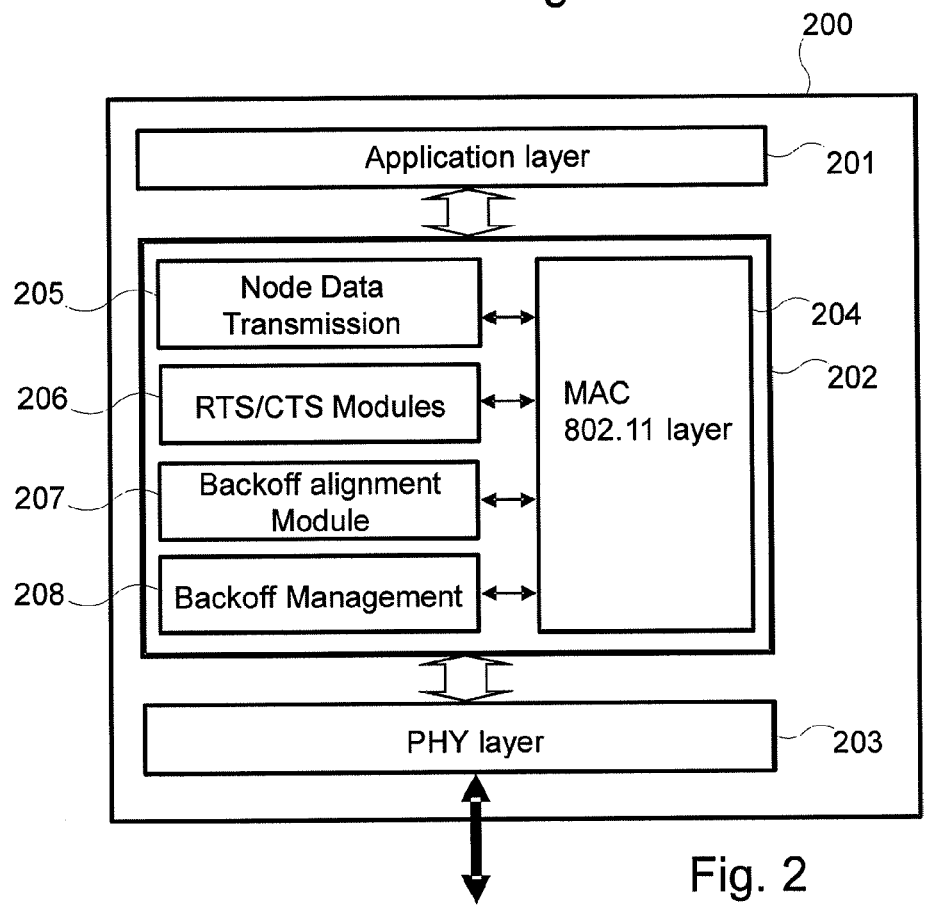
FIG. 2: illustrates a communication apparatus for a (transmitting or receiving) node adapted to incorporate the current invention.

FIG. 2 is a block diagram illustrating a schematic configuration of a communication apparatus 200 representing a transmitting node or a receiving node adapted to incorporate embodiments of the invention. The PHY (physical) layer block 203 is in charge of formatting data packets and sending data packets on the wireless medium. The MAC layer block 202 is composed of a standard MAC 802.11 layer 204 and four additional blocks implementing the invention:

node data transmission block 205 in charge of exchanging data packet with the PHY layer and the application layer RTS/CTS modules 206 in charge of managing Request-To-Send (RTS) and Clear-To-Send (CTS) messages back-off alignment module 207 capable of implementing an embodiment of the current invention, back-off management module 208 implements the back-off management.

The application layer block 201 facilitates application generating and receiving data packets, for example video data flows.

Figure 3:
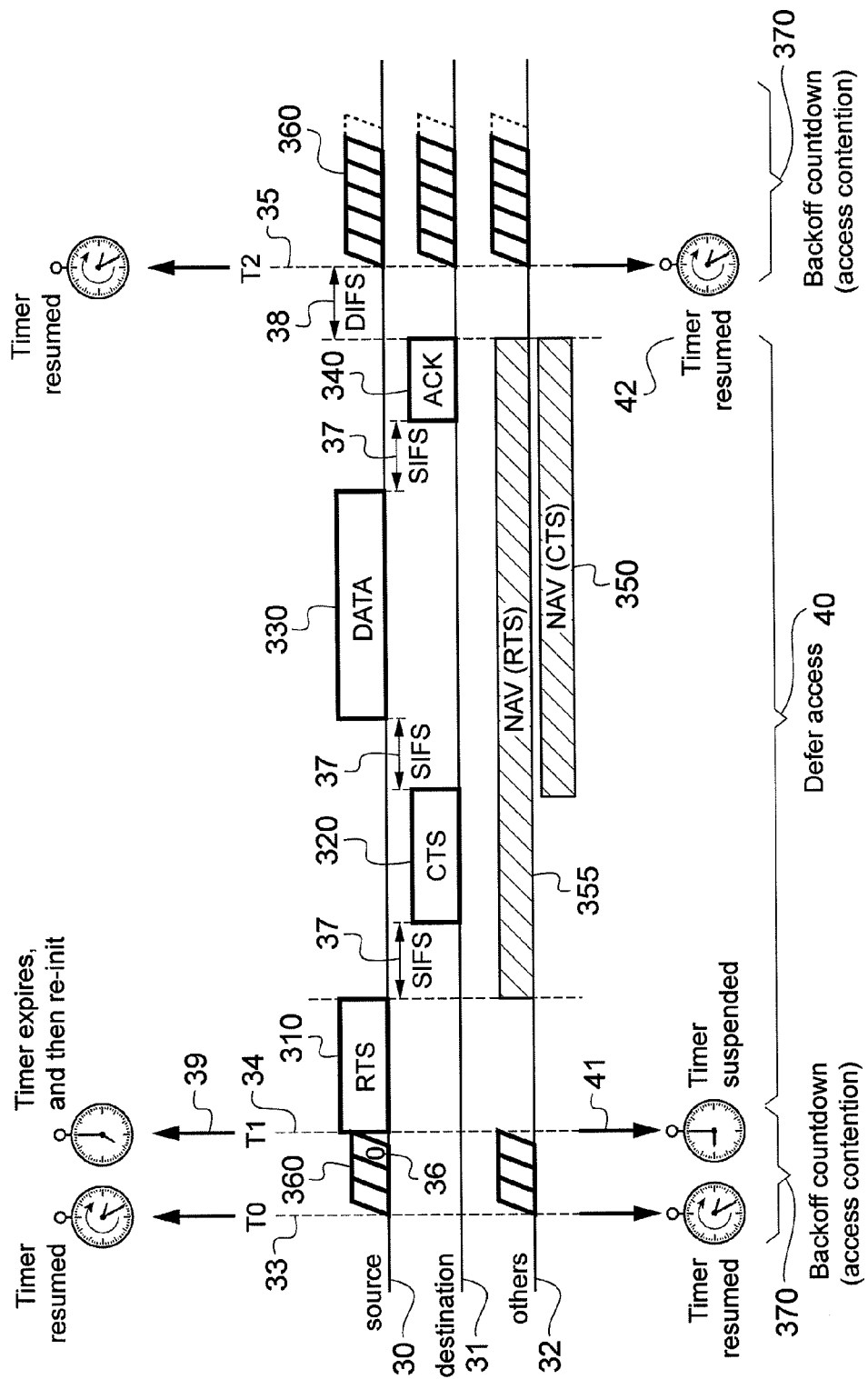
FIG. 3: illustrates a standard wireless medium access mechanism.

FIG. 3 depicts a standard access mechanism, facilitating access to a wireless medium for a node. The back-off procedure is one of the first processes to be implemented.

The figure illustrates the behavior of three groups of stations: source node 30, destination node 31 and other nodes 32.

Upon starting the back-off process prior to transmitting data, a station e.g. source node 30 initializes its back-off time counter to a 'random value' as explained above. The back-off time counter is decremented once every time slot 360 interval for so long as the channel is sensed idle (count down is starting from T0, 33 as shown in FIG. 3), 'frozen' or suspended when a transmission is detected on the channel (count down is stopping at T1, 34 as shown in FIG. 3), and reactivated when the channel is sensed idle again (as example at T2, 35 as shown in FIG. 3). When its back-off time counter reaches zero 36, the timer expires and then reinitializes 39. The station 30 transmits a data message, e.g. comprising RTS message 310, which contains the address of the receiver e.g. destination node 31 and the duration for which the medium is to be reserved for that message. Source node 30 expects to receive a CTS message 320 from destination node 31 before transmitting data 330. The messages are spaced using a SIFS (short inter-frame space) time interval 37, as required by the protocol.

The time unit in the 802.11 standard is the slot time called 'aSlotTime' parameter. This parameter is specified by the PHY (physical) layer (for example, aSlotTime is equal to 9 μs for the 802.11n standard). All dedicated space durations are multiple of this time unit.

The short inter-frame space 37 (SIFS) is used to separate a response frame from the frame that solicited the response, for example between a data frame and the acknowledgement response (for example, SIFS is equal to 16 μs for the 802.11n standard). The DCF inter-frame space (DIFS 38) defines the minimum waiting time for a transmitting node before trying to transmit some data (DIFS=SIFS+2*aSlotTime).

A collision occurs when two or more stations start transmission simultaneously (e.g. when their own back-off counter has reached zero nearly at the same time). Ideally, a consistent number of slots 360 are seen as being expired by all nodes forming the 802.11 cell, e.g. during a back-off countdown procedure 370. (It will be demonstrated further in relation to FIG. 5 that this may not be always the case in reality, because of inaccuracies in 802.11 quartz components which result in clock drifts).

As the CSMA/CA protocol does not rely on the capability of the stations to detect a collision by hearing their own transmission of data 330, a positive acknowledgement 340 (ACK) is transmitted by the destination station 31 to signal the successful packet reception. The ACK 340 is immediately transmitted at the end of the packet, after a period of time equivalent to the SIFS 37. If the transmitting station does not receive the ACK 340 within a specified ACK Timeout, or it detects the transmission of a different packet on the channel, it reschedules the packet transmission according to the given back-off rules.

Collision avoidance is specifically enhanced by the four-way handshaking mechanism of RTS/CTS 310, 320 exchange, which is a recommended option of the 802.11 standard. FIG. 3 illustrates such a medium access protection scheme but it should be noted that the RTS/CTS handshake is optional in the standard and it is possible the exchange between nodes comprises only data 330 and ACK 340.

Usually, according to 802.11 standard, to protect transmissions from collisions, a station begins a transmission sequence with an RTS/CTS exchange 310, 320: a node 30 will issue a Medium access request (called Request-to-send, or RTS 310) to a destination node 31, when the sender node aims to transmit data on the 802.11 medium. The duration specified in the RTS 310 is the duration of the entire exchange including the control packets (that means including RTS/CTS message exchange) and subsequent data packets. When the intended receiver destination node 31 receives the RTS 310, and senses the medium to be free, such destination node replies a Clear-to-send (CTS 320) message after waiting for one SIFS 37 period, thus acknowledging the request and so accepting receiving data. The CTS 320 also contains the duration of the entire exchange from that point of time. The transmitter source node 30 upon receiving the CTS 320 transmits the DATA 330 packet after an SIFS 37 period. The receiver responds back with an ACK 340 after a SIFS 37 period following its complete receipt of the DATA 330 packet.

Each wireless node maintains a data structure called the network allocation vector or NAV to store the aggregate duration of time it knows that the medium would be busy. For example, the NAV associated with the RTS 310 and CTS 320 are illustrated, labeled 355 and 350 respectively. Any node (e.g. others 32 on FIG. 3) hearing a packet not destined for itself, sets its NAV for the time duration mentioned in the packet header, which is equal to the time required to transmit all control and data packets. Access for the other nodes 32 is deferred 40 by suspending 41 their associated timer and then later resuming 42 the timer when the NAV has expired. This prevents these other nodes 32 from transmitting any packets during the period the NAV is set. It is possible that the destination node 32 does not receive the RTS 310 correctly because of a collision or fading. Even if it does, it may not always respond with a CTS 320 because, for example, the NAV is set. In any case, the transmitter goes through the random back-off and retries. The RTS/CTS mechanism is very effective in terms of system performance, especially when large packets are being transmitted, as it reduces the length of the frames involved in the contention process. In fact, assuming perfect channel sensing by every station, collision may occur only when two (or more) packets are transmitted within the same slot time. If both transmitting stations employ the RTS/CTS mechanism, collision occurs only on the RTS frames, and it is early detected by the transmitting stations by the lack of CTS responses.

Figure 4:
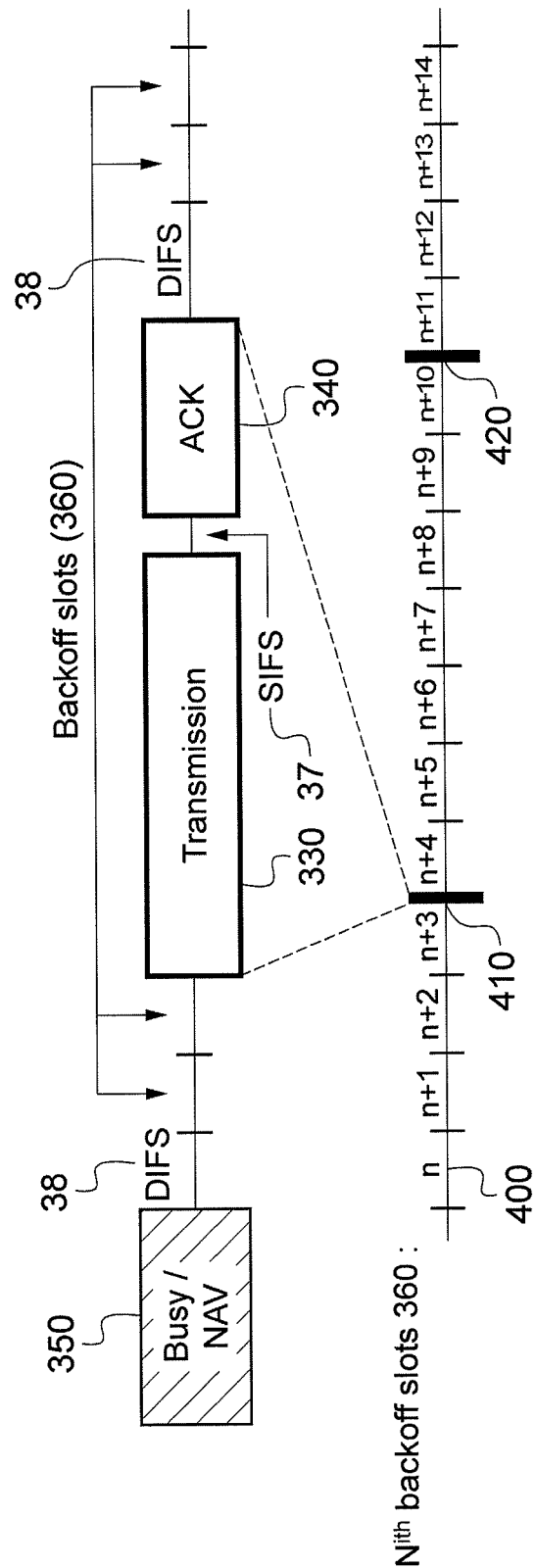
FIG. 4: illustrates a collaborative group back-off slot positioning.

FIG. 4 illustrates the collaborative group back-off slot positioning according to an embodiment of the invention.

Medium access collaboration is performed by watching the 'random values' used to initialize the back-off time counters among the group, in order that no back-off time count duplication occurs. Each node may generate a virtual local image of its peers' back-off time counters values by computing the back-off time of each of its peers, or have access by other means to said back-off values. Each node manages its own back-off time. Thus, each node of the group can predict the back-off time values of its peers and would attempt to access the wireless medium in a distinct back-off slot, avoiding any access collision among the group of peer nodes.

FIG. 4 illustrates this concept, in consideration of numbering any back-off slots 360 occurring in a CSMA/CA cell. The idea comprises spreading the allocation of back-off counts among the group of peer nodes to give a collaborative group back-off positioning. This is effected by positioning the back-off time expiration of each node of the collaborative group in a different slot number (as example, by considering an absolute scale of back-off slots, the current back-off count being number 'n' 400, the scheme would select 'n+3' 410 and 'n+10' 420 for two distinct peer nodes). The sharing of back-off slot positioning information may be performed either by messaging on the wireless channel, or in a preferred embodiment by pseudo-random generation of a next back-off slot computation according the collaborative group back-off slot positioning scheme of the invention. The count of expired back-off slots (said going from n to n+1) is performed by wireless channel spying by each node of the collaborative group.

Figure 5:
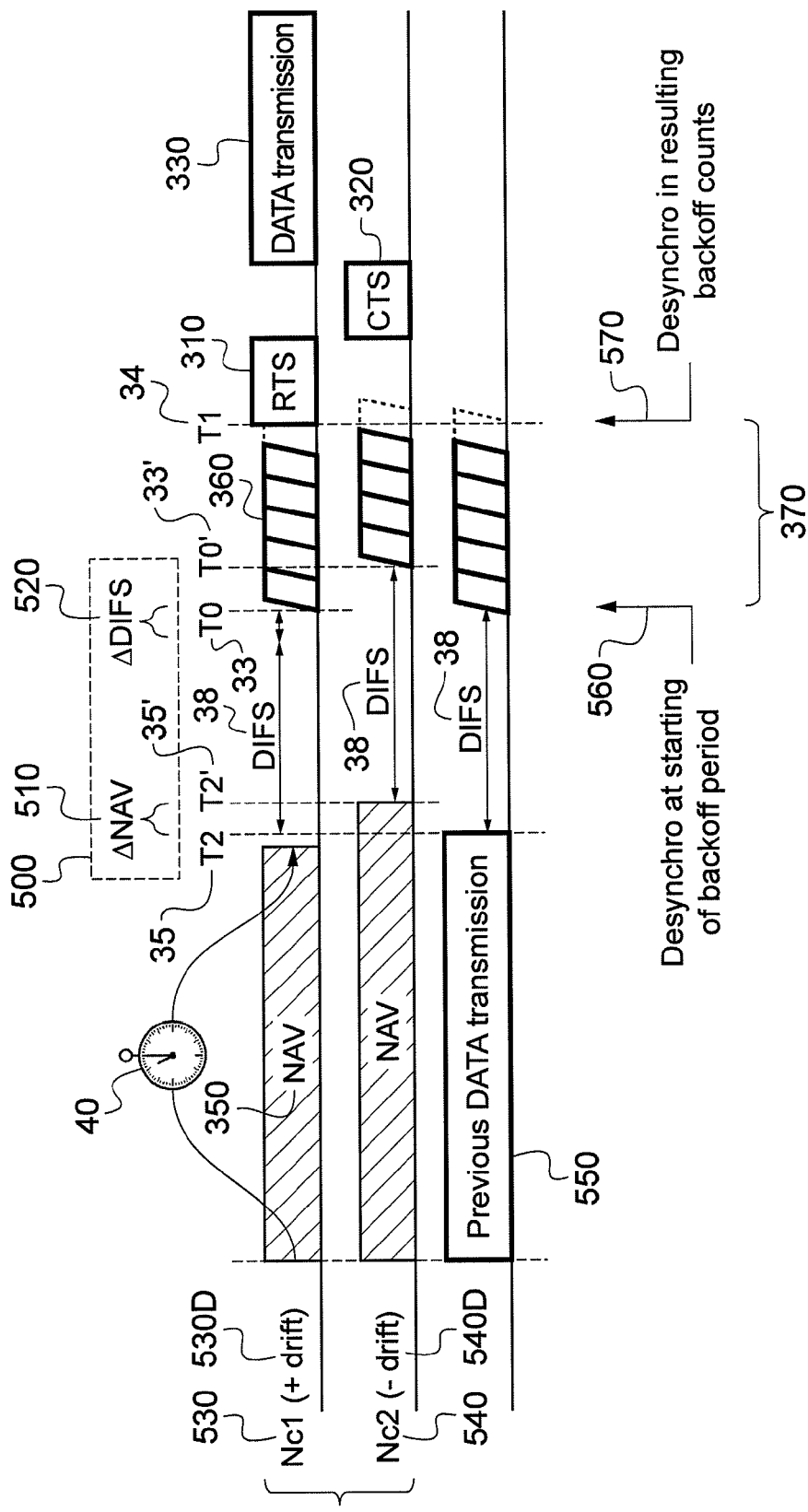
FIG. 5: illustrates clock drifting in a 802.11 cell.

FIG. 5 illustrates some possible clock drift locations 500 between 802.11 nodes e.g. ΔNAV 510 and ΔDIFS 520, and further it more especially shows the resulting effect for nodes pertaining to a collaborative group.

All clocks are subject to clock drift: oscillator frequency will vary unpredictably due to various physical effects. In time synchronization schemes, a single reference pulse or timestamp packets exchanged at a specific time provide only instantaneous synchronization. Immediately afterward, the synchronization will degrade as the clocks begin to drift apart again. Time synchronization precision will therefore decay as more time elapses between the synchronization pulses (or timestamp packets exchange) and the event of interest.

For a collaborative group of nodes e.g. Nc1 530 and Nc2 540 as shown in FIG. 5, which are accessing the medium following a back-off slot time precision, any timing event is potentially a point where clock drift is increasing. Each medium access is relevant: drifting is mainly located in NAV 350, but is also present to a lesser extent in the DIFS 38 period.

The behavior of the two nodes Nc1 530 and Nc2 540 is illustrated with respect to a previous transmission. As example, Nc1 has a positive drift 530D (meaning that its clock runs faster) compared to node Nc2, which has an associated negative drift 540D, and towards a previous data transmission 550 from another node (not shown). There is a lesser issue for Nc1 530, as it would sense the medium is still busy until T2 35. But Nc2 540 will detect that medium is free at time T2' 35' (35 prime), upon waking up from a period of inactivity. T2 35 and T2' 35' (35 prime) are clearly different and linked to node drift issue.

Then the back-off countdown procedure period would start at T0 for Nc1 and T0' for Nc2.

Upon detecting RTS 310 message directly after T1 time, back-off timers for all nodes are suspended and, according to the 802.11 standard, a calculation is performed to count the number of elapsed back-off slots between T0 33 and T1 34 for Nc1 530 and between T0' 33' (33 prime) and T1 34 for Nc2 540. Thus, the countdown procedure 370 has not the same duration for Nc1 530 and Nc2 540.

In the case illustrated in FIG. 5, node Nc1 530 counts five totally elapsed back-off slots while Nc2 540 counts four totally elapsed back-off slots. This is due to clock drift between the clock of Nc1 530 and the clock of Nc2 540. As a result, the counted number of slots 360 may be different among the nodes belonging to the group. For example, a desynchronisation at a starting of a back-off period 560 becomes a desynchronisation in resulting back-off counts 570. This can cause a disturbance within the collaborative group of nodes since the local image of the peers back-off counters obtained by locally computing the back-off time of each of the peers at each peer can differ from the counted number of slots. It follows that a risk of access collision exists between peer nodes of the collaborative group.

To solve this issue, a re-alignment of the back-off counters of the nodes of the group is proposed. Such a re-alignment scheme provides a solution to maintain a good alignment between back-off values of various nodes and could be implemented in any back-off slot counting medium access scheme, such as that cited in the prior art US2009/014738.

Figure 6:
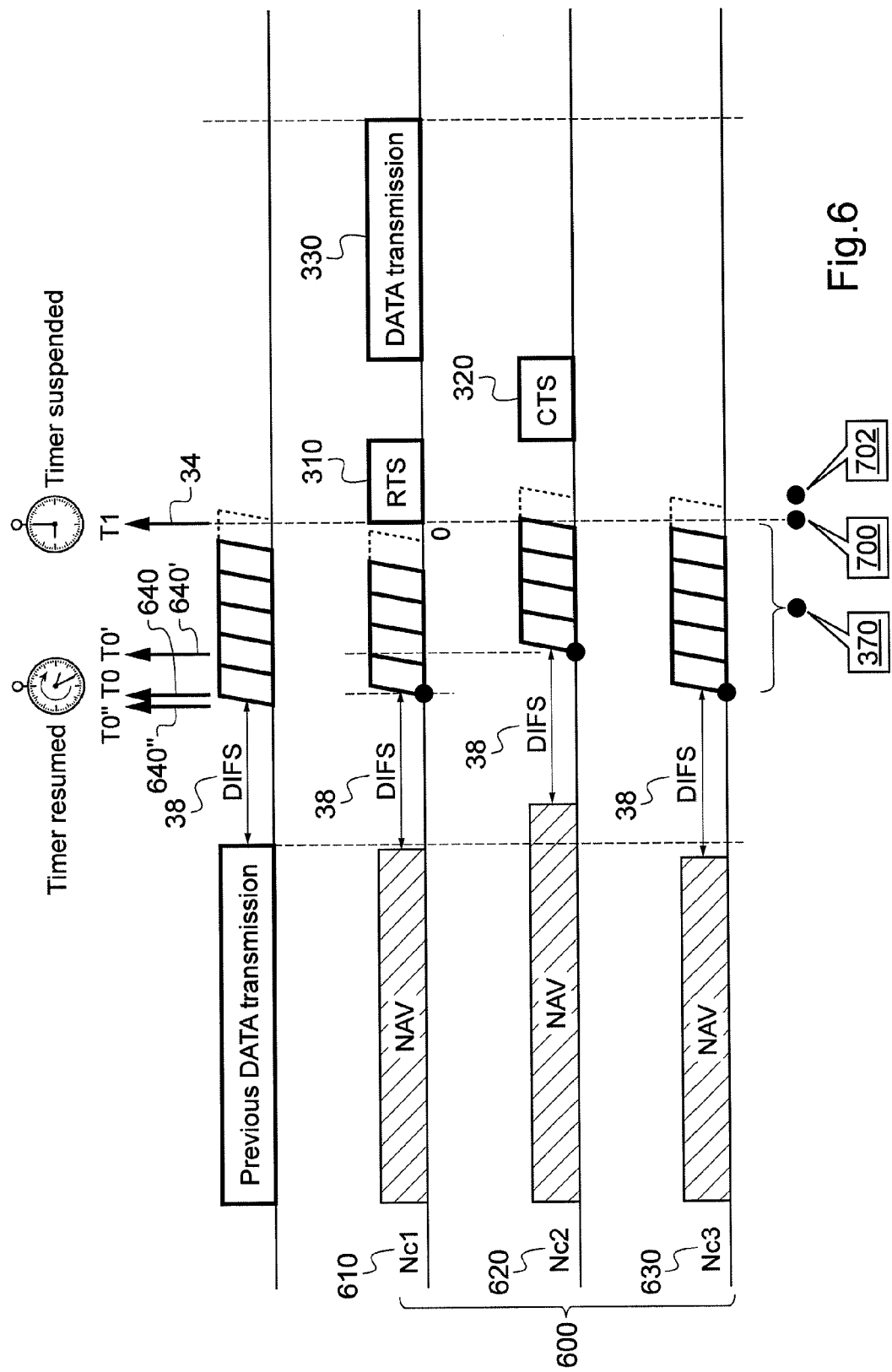
FIG. 6: illustrates a scheme for realigning back-off counter according to an embodiment of the current invention.

FIG. 6 illustrates the timing of steps performed by receiver nodes of the collaborative group 600 in order to realign their back-off counters.

In the given illustrative context of a group of three nodes: Nc1 610, Nc2 620, Nc3 630. Node Nc1 610 is accessing the medium first (transmission begins because the back-off Timer of Nc1 610 reaches zero), and the starting time (T0 640, T0' 640' (640 prime), T0" 640" (640 double prime)) in back-off procedure is different among the three nodes.

Upon issuing its RTS, Node Nc1 610 suspends all back-off procedure nearly at a unique time T1 34, considering the propagation delay for RTS 310 message and its detection on the medium (carrier sensing) is almost identical for all receivers Nc2 620 and Nc3 630. So, T1 34 may be considered as a synchronization communication event. As explained previously, the RTS 310 message is followed by a CTS 320 message before the transmitting of data 330.

Figure 7:
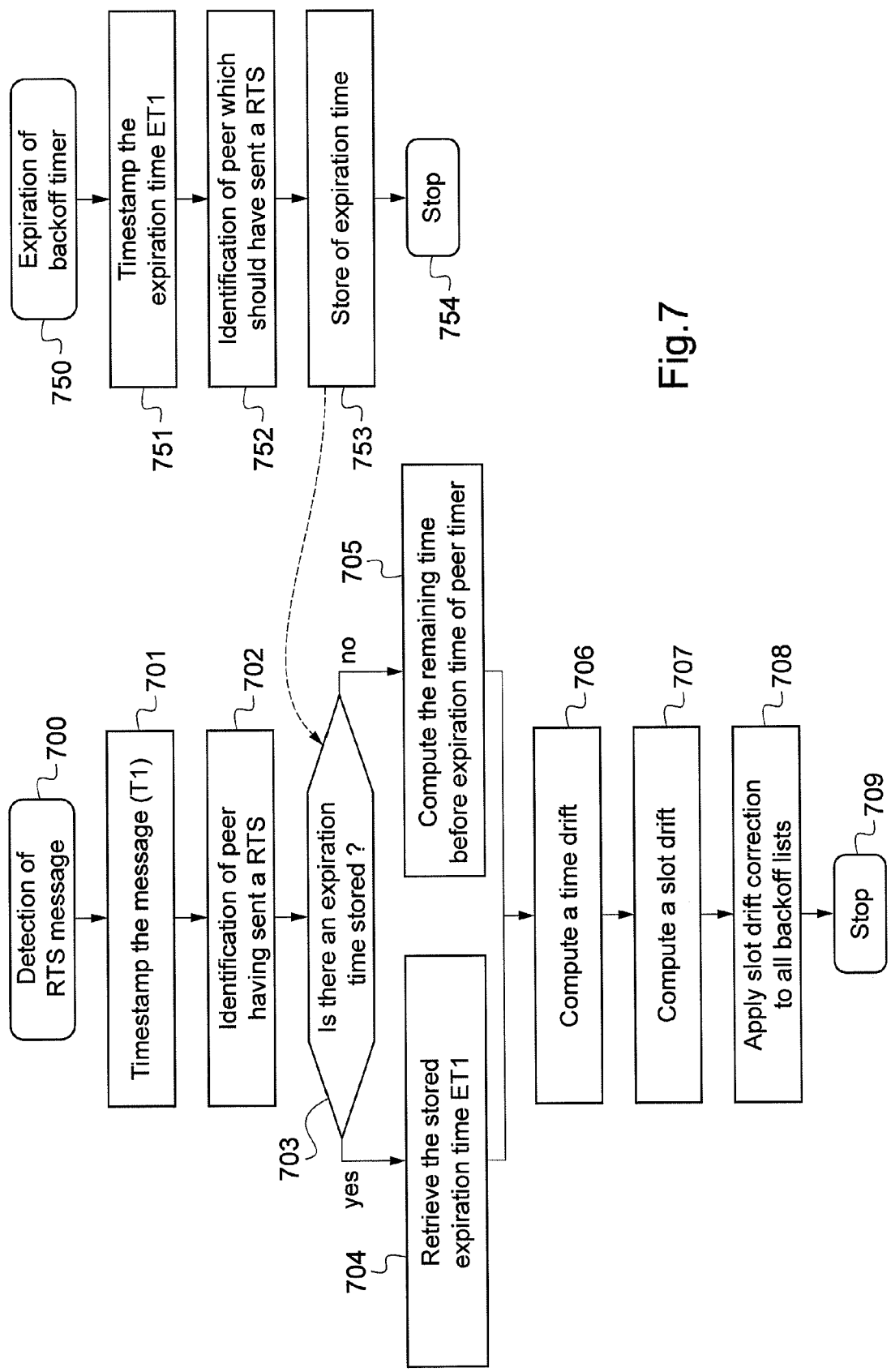
FIG. 7: illustrates a back-off counter alignment mechanism according to an embodiment of the current invention; and, FIG. 8: illustrates additional means which may be implemented in accordance with an embodiment of the current invention.

At step 700 (further illustrated in detail at step 700 of the algorithm described in FIG. 7) corresponding to time T1 34, all receivers of the 802.11 cell (including those Nc2 620 and Nc3 630 of the collaborative group) will suspend the back-off count down as stated in the 802.11 standard. All the back-off time counters are "timeslot bounded", meaning that the duration difference T1-T0, T1-T0', T1-T0" (T0, T0', T0" and T1 being indicated in the figure as 640, 640', 640" and 34, respectively) is computed and rounded to the minus integer part, in order to obtain an integer number of elapsed back-off slots. This is done so that if the medium is determined to be busy at any time during a back-off slot, then the back-off procedure is suspended; that is, the back-off timer shall not decrement for that slot. Each node of the collaborative group manages several back-off counters locally, one counter for itself (as legacy nodes), and generates one virtual 'image' counter for each peer node except itself. That is, at a given node, all the back-off counters are decremented by the locally determined number of elapsed back-off slots (as duration of countdown procedure 370 may be different at each node, the countdown result is different and the local back-off counts managed by one peer is de-aligned compared to those managed by other peers.

Requirement for Nc1 610, Nc2 620 and Nc3 630, in difference to legacy nodes, is to keep T1 and starting time for procedure 370 (T0 640 for Nc1 610,T0' 640' for Nc2 620, T0" 640" for Nc3 630) values in memory for the current medium access, in addition to the rounded back-off values usually stored in the context of the collaborative group.

Further, as Nc1 610 is accessing the medium, only Nc2 620 and Nc3 630 will apply step 702 of the algorithm described in FIG. 7. Basically, as nodes Nc2 620 and Nc3 630 detect that node Nc1 610 is communicating inside the collaborative group, this should mean back-off value of node Nc1 610 should be zero at T1 34 (its timer has expired). Thus, each image of Nc1 610 back-off counter (both locally and independently generated/computed in Nc2 620 and Nc3 630) should reflect that null value. If not the case, this indicates a drift is occurring, which should be rectified as shown in FIG. 7.

FIG. 7 describes algorithms according to an embodiment of the invention performed at receiver nodes among the collaborative group, when one of their peers is accessing the medium (for example, node Nc2 620 and Nc3 630—according to the example presented in FIG. 6—are receiver nodes while Nc1 610 is accessing the medium).

According to relative drift among nodes, either step 750 or step 700 is performed first: these two possible cases reflect, respectively, either a medium access event which is too late or an advance compared to an image timer generated by a receiving peer node of the collaborative group.

For example, if Nc3 630 node runs a quicker clock, then it is likely that step 750 occurs before step 700 for node Nc3 630: the timeout of scheduled virtual 'image' back-off counter relative to Nc1 610 will appear before the real medium access event T1 34.

Therefore, the expiration time of the back-off timer is first determined (time stamp the expiration time 751), the identification of a peer which should have sent a RTS is determined 752, and the combination of the two pieces of information leading to an expiration time is stored in memory 753 in a variable called ET1 (for expiration of timer relative to time T1 34). The algorithm then stops 754.

Upon detection by a receiver node accessing the medium (communication event), step 700 is executed. Here step 700 is illustrated as a detection of an RTS message, but in fact any communication message incoming from a collaborative peer node could be used to trigger the algorithm. In more detail, the 802.11 PHY consists of two sublayers: the PMD, or "Physical Medium Dependent" stack layer according 802.11 standard (i.e. The actual radio transceiver) and the PLCP, or "Physical Layer Convergence Procedure" stack layer according 802.11 (i.e. Aeps: as soon as the PMD detects a signal on the medium, the PLCP notifies the MAC by issuing the PHY-CCA.indication primitive with STATUS=busy, and then waits for the PMD receive function to synchronize with the incoming data stream. Once the PLCP has received enough of the incoming PMD data stream to detect a valid Start-of-Frame-Delimiter SFD and decode the parameters (including its length) from the PLCP Header, it issues a PHY-RXSTART.indication primitive to notify the MAC that a data packet is now arriving. In a preferred embodiment, the initiation of step 700 is performed upon PHY-CCA.indication primitive, because this is the first notification of carrier sense information change.

In step 701, time stamp the message (T1), such an event is time-stamped locally at each receiver node in reference to its local quartz. For example, a variable stores this local current time T1. It should be noted that the time drift among 802.11 nodes in sensing a communication on the channel is negligible. Time is needed to detect an incoming frame and synchronize with it (sensitivity within a maximum period of aCCATime (<4 µs)). According to the 802.11v standard, an implementation will necessarily determine when the start of the preamble for the incoming frame arrived at the receive antenna port by capturing a timestamp after it occurred and compensating for the delay by subtracting an offset from the captured value (this offset is commonly called Max Time-of-Arrival TOA Error and is expressed in units of 10 nanoseconds).

Then step 702 comprises the identification of the peer having sent a RTS i.e. the detection by a receiver node of an incoming RTS message coming from a peer node (for example Nc1 610). Such detection is easily performed by the receiver by analyzing the Wireless MAC address of emitter, the message type, and checking if the emitter address takes part of the collaborative group. It is not an object of the invention to describe the management of the collaborative group, but it can easily be understood that each peer node stores a list of address of group members, further used for determination of source of incoming messages.

Next, it is determined in the following step (is there an expiration time stored 703?) if any previous expiration of peer back-off timer was processed by steps 750 to 753.

If yes, ET1 is retrieved in step 704 from storage in memory (the memory zone containing ET1 is then erased). A computation of time drift is then effected 706:

Time_Drift=$ET1-T1$

This time drift is always negative, as peer node Nc1 610 has accessed the medium after receiver node Nc3 630 had expected.

If no, for step 703, then step 705 is performed: compute the remaining time before expiration of time of peer timer. This means the peer has taken the medium access before any local image back-off timer expiration at the receiver (e.g. Nc2 620) implementing the current algorithm (the talker peer Nc1 610 is faster). Due to classical 802.11 back-off procedure, any receiver node has suspended the back-off countdown: as the peer timer is automatically suspended, T0 640 (local date at which back-off procedure has started) and T1 34 (local date at which back-off has stopped) values are retrieved:

Time_Drift=$SET1-T1$

Where:

SET1 is the Scheduled Expiration Time of peer image timer,

T1 is the (current) time of back-off procedure stopped

As, according to the 802.11 standard, the T1 34 date serves to round the number of elapsed slots during back-off period 370, the previous formula can be updated as follows:

Time_Drift=$(SET1-T0)-((T1-T0)/a\text{SlotTime})$

This time drift is always positive, as peer has accessed the medium before receiver would have expected with respect to its local image of the back-off counter of the peer having taken the medium access.

Further, the time drift is converted into a number of back-off slots (step 707, compute a slot drift), in order to have a slot drift difference:

Slot_Drift=$\text{round\_to\_minus\_integer}(\text{Time\_Drift}/a\text{SlotTime})$ In step 708, apply slot drift correction to all backoff lists, all the receiver peers will re-align all back-off counters according to the computed slot drift. For each receiver peer this applies not only to its own local back-off counter but also to the local image of back-off counters for the peer having taken the medium access. The method stops at step 709.

It should be noted that the invention does not force usage of the time drift computed in 706 for performing a clock synchronization: here, the principle of the invention is to maintain a consistency of back-off counter image values among the collaborative group, independent of the deviation of the talker peer compared to the remainder of the group. Even if the talker drift is fully wrong, the others will follow him in their re-alignment decision for that medium access event. Consistency is given a higher priority than absolute accuracy.

As several peers may require medium access within a contention window period, such a back-off re-alignment mechanism can be applied regularly to improve wireless performance (no overhead in wireless bandwidth, low processing needs). Preferably, a back-off re-alignment mechanism is implemented each time a peer of the group requests access to the medium.

Figure 8:
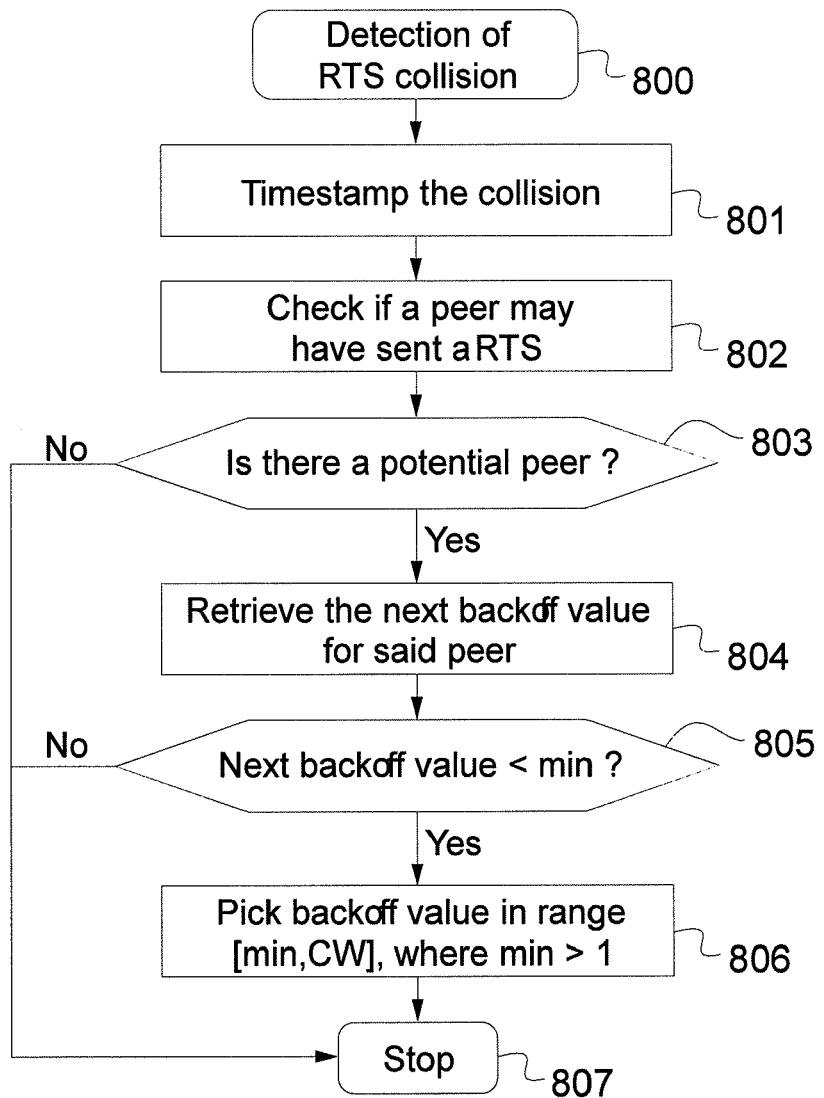

FIG. 8 illustrates additional means which may be implemented in accordance with an embodiment of the invention.

It is possible, in the event of access collision with legacy nodes, that the group is not aware of the drifting value of the accessing peer and may see the peer later. The challenge is to detect what occurred:

- is it access due to drift (as the current solution is targeted to solve)?
- is it a subsequent access, by the same node, following a collision on a previous access attempt? (This may be possible if, after a collision, the next generated and assigned back-off counter has a low value).

In order to recover and analyse the real event, a further embodiment of the invention may be utilised to distinguish between the two possible scenarios outlined above. One solution to prevent the second scenario detailed above is to perform a new back-off update computation:

back-off←rand[min, CW], where min (minimum)>1 slot

Thus, if a talker peer is seen talking, i.e. accessing the wireless medium, at a time coinciding with a few slot times later than expected by its peers, this is only due to clock drift.

The min value used for back-off allocation may be determined according to an average slot drift, in order to implement min>average_slot_drift.

The method begins with detection of an RTS collision 800. As discussed above the method should not be considered as limited to an RTS event. The collision is time-stamped 801 and a check made if a peer may have sent a RTS 802. A check is made 803: is there a potential peer ? If yes, a step 804 is implemented to retrieve the next back-off value for said peer. (If no, the method proceeds directly to end step 807). The next back-off value is compared with a minimum min in step 805. If the next back-off value is less than min, the method proceeds to step 806 (pick back-off value in range [min, CW] where min>1) and then to end step 807. If no, the method proceeds directly to end step 807.

It is advantageous to distinguish between time difference due to real clock drift and time differences due to collisions on the wireless medium. The probability of confusion is increased if, following a collision, the subsequent back-off value is low in magnitude. By setting a minimum value for the contention window (from which a back-off value will be chosen), which is greater than the average slot drift known for the device, it is possible to distinguish the different types of events.

The invention claimed is:

1. A method for optimizing access to a wireless medium in a communication network accessible by a plurality of nodes, each node implementing a back-off counting based on carrier sense multiple access with collision avoidance, the plurality of nodes comprising a collaborative group of peer nodes further implementing a back-off allocation scheme based on each node maintaining a list of expected back-off values of the other nodes of the collaborative group by generating a virtual local image of the other peer nodes back-off time counters values by computing the back-off time of each of said peer nodes, the group further comprising a receiving node and an emitting node, the method comprising the following steps implemented by the receiving node:

detecting a Medium access request from the emitting node;

time stamping of the Medium access request;

identifying the emitting node as an origin of the Medium access request;

determining an expiration time corresponding to an expected back-off value or back-off count of the identified emitting node in the list of expected back-off values of the other nodes of the collaborative group maintained by the receiving node;

determining a slot drift parameter from the said time stamp of the Medium access request and from the determined expiration time by:

computing the difference between a timestamp of the determined expiration time and the timestamp of the Medium access request when the expiration of the back-off time of the emitting node precedes the detection of a Medium access request; or computing the remaining time before expiration of the back-off time of the identified emitting node when the detection of a Medium access request precedes the expiration of the back-off time;

and, applying a slot drift correction based on the slot drift parameter comprising:

correcting a back-off counter of the receiving node, and correcting all the expected back-off values of the list maintained by the receiving node;

sensing if the wireless medium is free, and if the medium is sensed to be free:

waiting a Short Inter-Frame Space period;

sending a Clear To Send message.

2. The method as claimed in claim 1 wherein the slot drift parameter is a multiple of a back-off slot time unit.

3. The method as claimed in claim 1 wherein the elapsed time interval is determined according to the following steps:

noticing the expiration of the expected back-off count;

storing an associated expiration time ET1;

and, retrieving the stored expiration time ET1.

4. The method as claimed in claim 1 wherein the time interval before an expected expiration time is determined by the following step computing the remaining time before the expected expiration time.

5. The method as claimed in claim 1 wherein the slot drift correction comprises adding the slot drift parameter to at least one back-off value.

6. The method as claimed in claim 5 wherein the slot drift correction comprises adding the slot drift parameter to all back-off values.

7. A method for optimizing access to a wireless medium in a communication network accessible by a plurality of nodes, each implementing a back-off counting based on carrier sense multiple access with collision avoidance, the plurality of nodes comprising a collaborative group of peer nodes further implementing a back-off allocation scheme based on maintaining in each node a list of expected back-off values of the other nodes of the collaborative group by generating a virtual local image of the other peer nodes back-off time counters values by computing the back-off time of each of said peer nodes, the group further comprising a receiving node and an emitting node, the method comprising the following steps implemented by the receiving node:

detecting a Medium access request from the emitting node;
  time stamping the Medium access request, to a time T1;
  identifying a peer node of the collaborative group as origin of the Medium access request;
  checking if an expiration time corresponding to an expected back-off value or back-off count of the identified peer node, is stored in the list of expected back-off values of the other nodes of the collaborative group maintained by the receiving node:
    if yes, retrieving the stored expiration time;
    if no, computing the remaining time before expiration of a timer of the peer node of the collaborative group;
  computing an associated time drift from the time T1 of the Medium access request and from the determined expiration time by:
    computing the difference between a timestamp of the determined expiration time and the timestamp of the Medium access request when the expiration of the back-off timer of the emitting node precedes the detection of a Medium access request; or
    computing the remaining time before expiration of the back-off timer of the identified emitting node when the detection of a Medium access request precedes the expiration of the back-off timer;
  computing a slot drift correction based on the time drift;
  applying the slot drift correction to all expected back-off values of the list maintained by the receiving node,
  waiting a Short Inter-Frame Space period; and,
  sending a Clear To Send message.

8. The method as claimed in claim 7 wherein the slot drift correction is equal to the time drift divided by a back-off slot time unit.

9. The method as claimed in claim 7 wherein the communication event is a request-to-send announcement of the emitting node.

10. The method as claimed in claim 7 comprising the further steps, effected by the receiving node, of:
  detecting of a collision event of a communication or collision event of a request-to-send;
  time stamping the collision;
  checking if the collision event originates from a first node of the collaborative group;
  retrieving a next back-off value for the first node;
  calculating if the next back-off value is less than a min value;
  if so, picking a new back-off value of the first node in a range [min, CW] where min>1 and CW is an integer maximum value of a contention window.

11. The method as claimed in claim 10 wherein the step of checking of the collision event origin comprises:
  determining if the timestamp of the collision corresponds to an expiration time of an expected back-off count in the list;
  and, identifying the node of the group associated to said determined back-off count, as a first node.

12. The method as claimed in claim 10 comprising the further step of updating a back-off value of the receiving node to the new back-off value of the first node in the list of back-off values maintained by the receiving node.

13. The method as claimed in claim 7 wherein any node of the collaborative group is the receiving node and/or the collaborative group comprises a plurality of receiving nodes.

14. The method as claimed in claim 7 wherein the expected back-off values contained in the list are local images of the back-off counters values of the other nodes of the group.

15. The method as claimed in claim 14 wherein the local images are internally generated by each collaborative node.

16. The method as claimed in claim 7 wherein the back-off timers of all nodes are suspended upon detection of the communication event from the emitting node.

17. A non-transitory computer-readable storage medium for storing a computer program for optimizing access to a wireless medium in a communication network accessible by a plurality of nodes, each node implementing a back-off counting based on carrier sense multiple access with collision avoidance, the plurality of nodes comprising a collaborative group of peer nodes further implementing a back-off allocation scheme based on each node maintaining a list of expected back-off values of the other nodes of the collaborative group by generating a virtual local image of the other peer nodes back-off time counters values by computing the back-off time of each of said peer nodes, the group further comprising a receiving node and an emitting node, wherein the program for optimizing access to a wireless medium can be loaded into the receiving node and comprises instructions executable by a processor for carrying the steps of:

detecting a Medium access request from the emitting node;
  time stamping of the Medium access request;
  identifying the emitting node as an origin of the Medium access request;
  determining an expiration time corresponding to an expected back-off value or back-off count of the identified emitting node in the list of expected back-off values of the other nodes of the collaborative group maintained by the receiving node;
  determining a slot drift parameter from the said time stamp of the Medium access request and from the determined expiration time by:
    computing the difference between a timestamp of the determined expiration time and the timestamp of the Medium access request when the expiration of the back-off time of the emitting node precedes the detection of a Medium access request; or
    computing the remaining time before expiration of the back-off time of the identified emitting node when the detection of a Medium access request precedes the expiration of the back-off time; and
  applying a slot drift correction, based on the slot drift parameter, comprising:
    correcting a back-off counter of the receiving node, and correcting all the expected back-off values of the list maintained by the receiving node;

sensing if the wireless medium is free, and if the medium is sensed to be free:
waiting a Short Inter-Frame Space period;
sending a Clear To Send message.

18. A non-transitory computer-readable storage medium for storing a computer program for optimizing access to a wireless medium in a communication network accessible by a plurality of nodes, each implementing a back-off counting based on carrier sense multiple access with collision avoidance, the plurality of nodes comprising a collaborative group of peer nodes further implementing a back-off allocation scheme based on maintaining in each node a list of expected back-off values of the other nodes of the collaborative group by generating a virtual local image of the other peer nodes back-off time counters values by computing the back-off time of each of said peer nodes, the group further comprising a receiving node and an emitting node, wherein the program for optimizing access to a wireless medium can be loaded into the receiving node and comprises instructions executable by a processor for carrying the steps of:
  detecting a Medium access request from the emitting node;
  time stamping the Medium access request, to a time T1;
  identifying a peer node of the collaborative group as origin of the Medium access request;
  checking if an expiration time, corresponding to an expected back-off value or back-off count of the identified peer node, is stored in the list of expected back-off values of the other nodes of the collaborative group maintained by the receiving node:
    if yes, retrieving the stored expiration time;
    if no, computing the remaining time before expiration of a timer of the peer node of the collaborative group;
  computing an associated time drift from the time T1 of the Medium access request and from the determined expiration time by:
    computing the difference between a timestamp of the determined expiration time and the timestamp of the Medium access request when the expiration of the back-off timer of the emitting node precedes the detection of a Medium access request; or
    computing the remaining time before expiration of the back-off timer of the identified emitting node when the detection of a Medium access request precedes the expiration of the back-off timer;
  computing a slot drift correction based on the time drift;
  applying the slot drift correction to all expected back-off values of the list maintained by the receiving node,
  sensing if the wireless medium is free, and if the medium is sensed to be free:
  waiting a Short Inter-Frame Space period; and,
  sending a Clear To Send message.

19. A device for optimizing access to a wireless medium in a communication network accessible by a plurality of nodes, each node implementing a back-off counting based on carrier sense multiple access with collision avoidance, the plurality of nodes comprising a collaborative group of peer nodes further implementing a back-off allocation scheme based on each node maintaining a list of expected back-off values of the other nodes of the collaborative group by generating a virtual local image of the other peer nodes back-off time counters values by computing the back-off time of each of said peer nodes, the group further comprising a receiving node and an emitting node, the device comprising:
  means for detecting, a Medium access request from the emitting node;
  means for time stamping of the Medium access request;
  means for identifying the emitting node as an origin of the Medium access request;
  means for determining an expiration time corresponding to an expected back-off value of the identified emitting node in the list of expected back-off values of the other nodes of the collaborative group maintained by the receiving node;
  means for determining a slot drift parameter from the said time stamp of the Medium access request and from the determined expiration time by:
    computing the difference between a timestamp of the determined expiration time and the timestamp of the Medium access request when the expiration of the back-off time of the emitting node precedes the detection of a Medium access request; or
    computing the remaining time before expiration of the back-off time of the identified emitting node when the detection of a Medium access request precedes the expiration of the back-off time;
  and, means for applying a slot drift correction, based on the slot drift parameter, comprising:
    means for correcting a back-off counter of the receiving node, and
    means for correcting all the expected back-off values of the list maintained by the receiving node;
  means for sensing if the wireless medium is free, and if the medium is sensed to be free:
  waiting a Short Inter-Frame Space period;
  sending a Clear To Send message.

20. The device as claimed in claim 19 further comprising:
  means for noticing the expiration of the expected back-off count;
  means for storing an associated expiration time ET1;
  and, means for retrieving the stored expiration time ET1.

21. The device as claimed in claim 19 further comprising means for computing the remaining time before the expected expiration time.

22. The device as claimed in claim 19 further comprising:
  means for detecting of a collision event of a communication or collision event of a request-to-send;
  means for timestamping the collision;
  means for checking if the RTS originates from a first node of the collaborative group;
  means for retrieving a next back-off value for the first node;
  means for calculating if the next back-off value is less than a min value;
  and, means for picking a new back-off value of the first node in a range [min, CW] where min>1 and CW is an integer maximum value of a contention window.

* * * * *